United States Patent [19]

Gagnon

[11] Patent Number: 4,715,684
[45] Date of Patent: Dec. 29, 1987

[54] OPTICAL SYSTEM FOR THREE COLOR LIQUID CRYSTAL LIGHT VALVE IMAGE PROJECTION SYSTEM

[75] Inventor: Ralph J. Gagnon, Chico, Calif.

[73] Assignee: Hughes Aircraft Company, Los Angeles, Calif.

[21] Appl. No.: 622,528

[22] Filed: Jun. 20, 1984

[51] Int. Cl.$^4$ .............. G02F 1/13; G02B 27/14; G02B 27/28; G02B 21/00

[52] U.S. Cl. .............. 350/331 R; 350/173; 350/408; 353/33

[58] Field of Search .............. 350/331 R, 342, 173, 350/175, 572, 573, 403, 408; 358/225, 231, 232, 250; 353/30, 31, 33

[56] References Cited

U.S. PATENT DOCUMENTS

| | | | |
|---|---|---|---|
| 2,422,376 | 6/1947 | Turner et al. | 350/173 |
| 2,669,902 | 9/1950 | Barnes | 350/572 |
| 3,521,944 | 6/1967 | Kishikawa | 358/173 |
| 4,058,827 | 11/1977 | Ando et al. | 350/173 |
| 4,234,894 | 11/1980 | Tokumaru et al. | 350/250 |
| 4,425,028 | 1/1984 | Gagnon | 350/331 R |
| 4,464,018 | 8/1984 | Gagnon | 350/331 R |
| 4,464,019 | 8/1984 | Gagnon | 350/331 R |
| 4,500,172 | 2/1985 | Gagnon et al. | 350/331 R |
| 4,544,237 | 10/1985 | Gagnon | 350/331 R |
| 4,571,628 | 2/1986 | Thornton | 358/250 X |

Primary Examiner—Stanley D. Miller
Assistant Examiner—David Lewis
Attorney, Agent, or Firm—A. W. Karambelas

[57] ABSTRACT

A two lens optical system for a three primary color liquid crystal light valve image projection system. The first lens projects the red and green primary colors, while the other lens projects the blue primary color. The light from the illumination system is partially prepolarized by a first prism before being split into two optical paths by a first beam splitter. Red light having a first and second polarization and green light having a first polarization is transmitted along a first optical path to a second, or main beam splitter, from the first beam splitter. The red light is transmitted to a first light valve, the green light being reflected to a second light valve. With the first and second light valves "on" state, the light incident thereon is directed back to the main beam splitter, recombined and then directed to the first projection lens. Green and blue light of the second polarization is reflected along a second optical path by the first beam splitter, the blue color light being transmitted through a third beam splitter to a third light input valve. The third light valve "on" state, the blue light incident thereon is directed to the third beam splitter and then to the second projection lens. By utilizing the two different optical paths, high image contrast is achieved. The optical system utilizes a minimum of optical components such that light losses in the system are reduced, thus increasing overall system collection efficiency.

20 Claims, 3 Drawing Figures

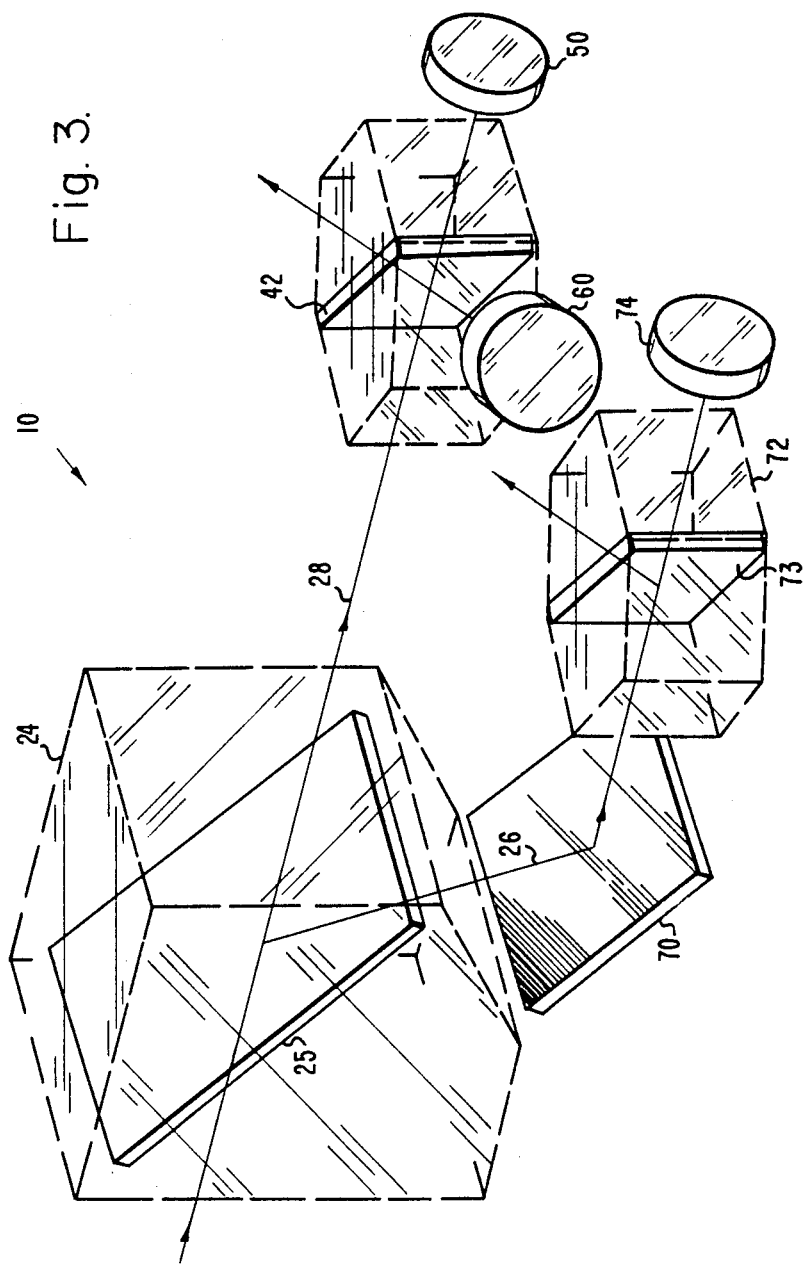

OPTICAL SYSTEM FOR THREE COLOR LIQUID CRYSTAL LIGHT VALVE IMAGE PROJECTION SYSTEM

BACKGROUND OF THE INVENTION

1. Field of the Invention

This invention relates to liquid crystal light valve (LCLV) projectors and in particular, to a two-lens optical system for use in three-color liquid-crystal light valve projectors wherein two separate optical paths are provided.

2. Description of the Prior Art

The development of the liquid crystal light valve has opened the door to substantial progress in the state of the art of high quality large screen projectors. The reflective-mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer to the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal ("on" state). Linearly polarized projection light passing through the liquid crystal layer and reflected from the dielectric mirrors is polarization-modulated in accordance with the information incident on the photoconductor. Therefore, if a complex distribution of light, for example, a high resolution input image, but of low intensity or brightness, is focused onto the photoconductor surface, the device converts the image into a replica which can be projected with magnification to produce a high brightness image on a viewing screen. U.S. Pat. No. 4,019,807 issued to D. D. Boswell et al. on Apr. 26, 1977 disclosed such a high performance reflective mode liquid crystal light valve.

A graphics display projector using a liquid crystal light valve of the above type is described in an article entitled "Application of the Liquid Crystal Light Valve to a Large Screen Graphics Display," published in the 1979 *Society for Information Display* (SID), International Symposium, Digest of Technical Papers, May 1979, pp. 22-23. This display system, a type with which the present invention is particularly but not exclusively concerned, projects a large scale image having yellow-white characters on a dark blue background. The system includes a cathode ray tube (CRT) which provides input imagery; projection optics which provide the bright collimated output beam and necessary light polarization; and the liquid crystal light valve which interfaces the input and output function.

The system uses a powerful light source such as a xenon arc lamp to illuminate the liquid crystal light valve through collimating and polarizing optics. Light emitted from the xenon arc lamp is transmitted to a main polarizing prism where it is separated into S and P components where the P component passes through the prism while the S component is reflected toward the light valve. Information displayed by cathode ray tube is transferred by fiber optics to one side of the light valve which changes the polarization state from S to P. The light is then transmitted through the prism and imaged on a screen by a projector lens. In this capacity, the main prism functions as an analyzer, converting modulations of polarizaton to modulations of brightness or intensity.

The quality of the projected image is generally a function of brightness, resolution and contrast. Image quality can generally be improved by placing a prepolarizing prism in the optical path in front of the main polarizing prism. The prepolarizing prism is somewhat effective in overcoming the deficiencies in the main polarizing prism. That is, since the main polarizing prism is not 100% effective in transmitting light of one polarization and reflecting light of another, light of an undesirable polarization may reach the light valve and be modulated and reflected back through the main prism onto the projection lens. This often results in distortions of color and/or reductions in contrast and resolution.

Since the prepolarizing prism may, for reasons of cost, be of the same design as the main prism, it would typically have similar reflectance and transmittance characteristics. However, when the two prisms are used in combination, the additive effect is such as to greatly improve the quality of the projected image. The prepolarizing prism substantially removes light of one polarization from the beam which illuminates the main prism. The main prism then acts on the beam to substantially remove the residual light of the undesirable polarization state.

However, in some applications it is desirable to use a second liquid crystal light valve for enhanced information displaying capability and versatility. In this application, the use of the prepolarizing prism becomes problematic insofar as the second light valve would require light of the polarization that would otherwise be removed by the prepolarizing prism. As a result, the use of a second light valve forced a compromise in the quality of the projected image.

This problem was addressed by the Applicant and Roy Cedarstrom in a copending application entitled "Two-Color Liquid Crystal Light Valve Image Projection System with Single Prepolarizer" U.S. patent application Ser. No. 334,679, filed Dec. 28, 1981 and assigned to the assignee of this patent application. It provides color selective prepolarization of the light incident upon two or more light valves. This is accomplished by use of a prepolarizing prism which acts on light from a light source to direct light of a first polarization to a first dichroic separator and light of a second polarization to a second dichroic separator. The resulting beams are recombined in a dichroic adder prior to being applied to the main polarizing prism. The main prism directs light of a first color and first polarization state to a first light valve and light of a second color and second polarization state to a second light valve in the conventional manner.

A second copending application by the Applicant entitled "High Efficiency Optical Tank for Three Color Liquid Crystal Light Valve Image Projection With Color Selective Prepolarization," U.S. patent application Ser. No. 334,680, filed Dec. 28, 1981, and assigned to the assignee of the present invention describes a system which provides full color, high contrast image projection with an oil coupled optical arrangement. In particular, a unitary optical arrangement with four beam splitters, two filters and a beam combiner is provided. The first beam splitter separates light from a source into first and second beams with the first beam having a first color component and the second beam having second and third color components. This second beam splitter is mounted within the container in optical alignment with the first for directing light in the first beam to a first light valve. The light valve modulates the polarization of the light in the first beam and returns it to the second beam splitter where modulations of polarization are converted to modulations of intensity in the conventional manner. The second beam splitter reflects the light to a first projection lens. The third beam splitter is mounted in optical alignment with the first beam splitter. It separates the second beam into third and fourth beams having first and second polarization states, respectively. The third beam is reflected to a first filter which passes light of a second color. The fourth beam is transmitted to a second filter which passes light of a third color.

The output of each filter is a substantially monochromatic beam of a single polarization state. The filter outputs are recombined into a single beam which illuminates a fourth beam splitter. The fourth beam splitter is the main polarizing prism. It reflects light of the first polarization state to a second light valve and transmits light of the second polarization state to a third light valve. The light valves modulate the polarization state of incident light in the conventional manner and return it to the main prism where it is recombined into a single beam. This beam is directed to a second projection lens.

Although the system described in the second copending application provides many advantages, the relatively large number of optical components required makes the system expensive and relatively complex. In addition, the light loss introduced into the system due to the number of optical components utilized reduces the efficiency (amount of light collected at the light valves) of the optical system.

SUMMARY OF THE INVENTION

A two-lens optical system is provided for a three-primary color liquid crystal light valve projector system. The first lens projects the red and green primary colors, while the other lens projects the blue primary color. The light from the illumination system is partially prepolarized before being split into two optical paths by a first beam splitter. Red light having a first and second polarization and green light having a first polarization is transmitted along a first optical path to a second, or main beam splitter, from the first beam splitter. The red light is transmitted to a first light valve, green light being reflected to a second light valve. With the first and second light valves "on" state, the light incident thereon is directed back to the main beam splitter, recombined, then directed to the first projection lens. Green and blue light of a second polarization is reflected along a second optical path by the first beam splitter, the blue color light being transmitted through a third beam splitter to a third light valve. With the third light valve in an "on" state, the blue light incident thereon is directed to the third beam splitter, and then to the second projection lens. The blue and green colors are high contrast because these are prepolarized, red being high in contrast because the main prism is designed to have high red contrast. Utilizing two optical paths in a system with a minimum number of optical components allows very high image contrast to be achieved together with light collection efficiencies about twice as large as that attained by prior art methods.

BRIEF DESCRIPTION OF THE DRAWINGS

For a better understanding of the invention as well as further features and objects thereof, reference is made to the following description which is to be read in conjunction with the accompanying drawing wherein:

FIG. 3 is a perspective view of the novel optical system utilized in the aforementioned projector system.

DETAILED DESCRIPTION OF THE INVENTION

Figure 1:
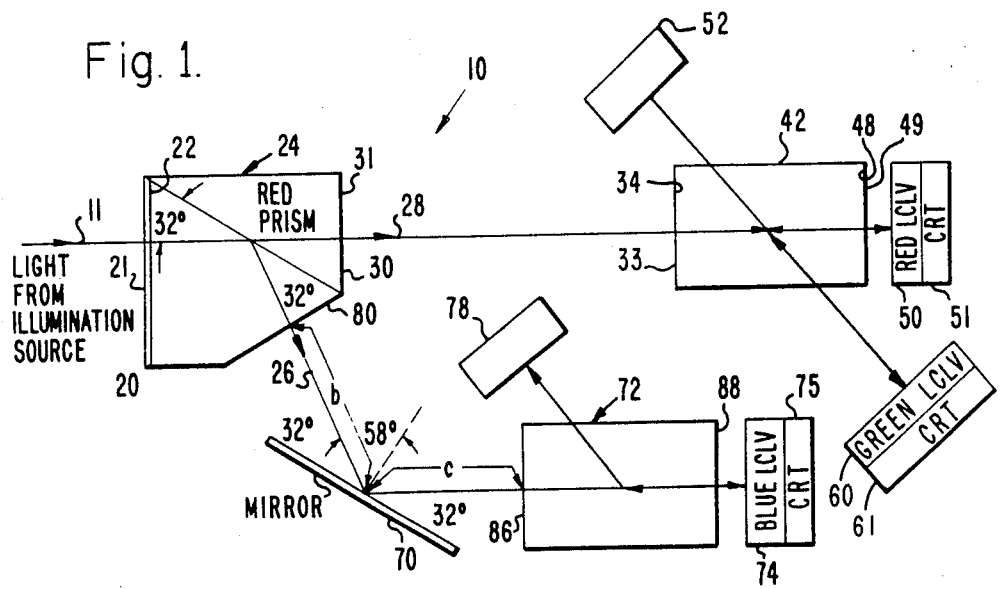
FIG. 1 is a plane view of the novel optical layout (approximately half scale) of the beam splitter and dichroic portions of the optical system utilized in a liquid crystal light valve projector system.
Figure 2:
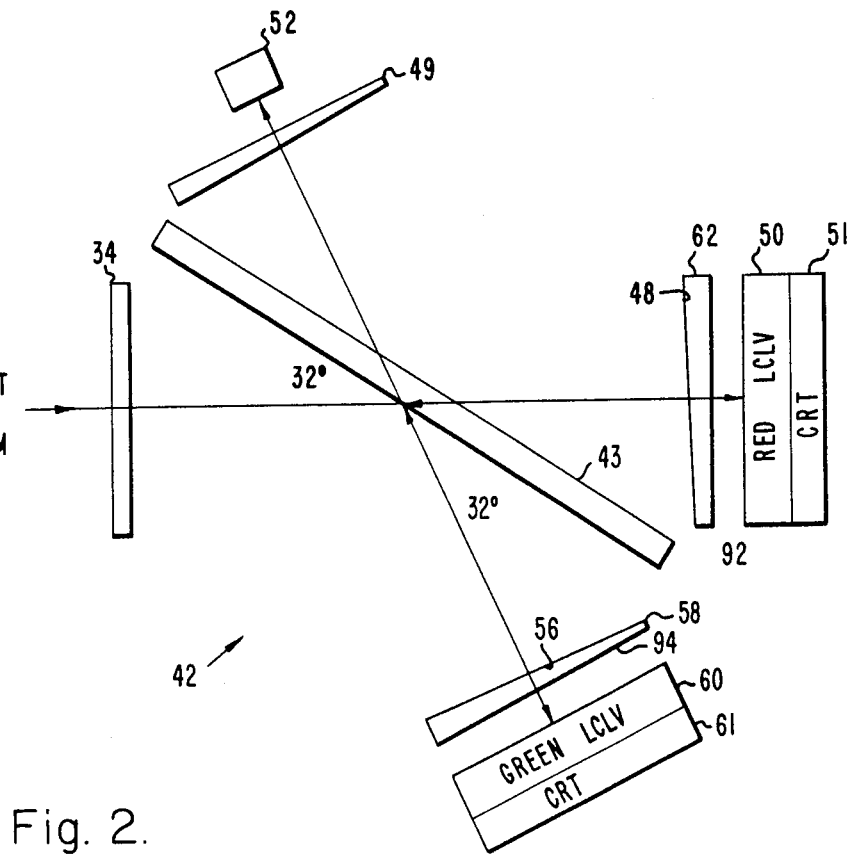
FIG. 2 is a top view of the layout shown in FIG. 1 showing the main prism in more detail.

Referring now to FIGS. 1 and 2, the novel optical system 10 of the present invention is designed for use in a liquid crystal light valve image projector system and is illustrated in layout form. Unpolarized light 11 from an illumination system (not shown) such as that provided by a xenon arc lamp, illuminates the liquid crystal light valves through the collimating and polarizing optics. The theory and operation of liquid crystal light valve projector systems has been set forth hereinabove in the background section, and is also described in detail in the aforementioned copending applications, and thus will not be repeated herein. The generated light is first incident on ultra-violet (UV) filter 20 which is applied over an antireflection coating 21 formed on surface 22, surface 22 forming the input aperture for a prepolarizing beam splitter, or prism 24. The primary purpose of UV filter 20 is to protect the liquid crystal. In addition, the UV filter 20 reflects ultra violet light from the system optical path, thus protecting the oil therein which would otherwise overheat and break down. In essence the filter 20 passes the visible light spectrum. It is noted that each of the beam splitter coatings utilized in the optical system are separately immersed in oil contained in the prism. A dichroic coating 25 formed in red prism 24 reflects green S and blue S polarized light downwardly along one optical path, represented by arrow 26, and transmits red S, red P, green P and blue P polarized light along another optical path, represented by arrow 28 to a main prism 42. Thus, the incident light is divided into two optical paths, the light emerging from the prism 24 in both paths being polarized except for the red component transmitted along path 28. Prism 24 is thus designed to provide a plurality of optical functions, i.e., separation of light according to color and polarization states, which, in the prior art are accomplished by additional optical components. An antireflection optical coating 31 for minimizing light loss is formed on the output aperture 30 of prism 24. The green light, which is most critical for its impact on image contrast, is P polarized. The red light is unpolarized, but this can be accommodated because the red lumen flux is less than the green lumen flux and the main prism 42 is designed to have very high contrast in red, thus reducing the need for red prepolarization.

Prism 24 transmits red P, green P, blue P and red S. A blue filter 34 is formed on the input aperture 33 of prism 42 and removes the blue P from the optical path 28. The orientation of the main beam splitter 42 is such that the roles of S and P are reversed relative to that of prism 24. Thus the light reaching the main beam splitter 42 is effectively red P, red S and green S.

The red P is transmitted through a dichroic coating 43 of prism 42 and through a red pass filter 48 coated on the output aperture 49 of prism 42 to the red liquid crystal light valve 50. When the red light valve 50 is in the "off" state, the red P is reflected by the light valve 50 back to the main beam splitter 42. It is necessary that the "off" light not be reflected to red-green projection lens 52; hence the main beam splitter 42 is designed such that it has very low reflectance of P for the red wavelengths in a predetermined angular range typically 56°≦ incidence angle ≦60°. As has been described in the copending applications, when the red light valve 50 is in the "on" state, the incident red P light is converted to red S light, the light valve modulating the polarization states of the incident light in accordance with writing light provided by an adjacent cathode ray tube 51 in a conventional manner. The polarization modulator light is returned to the main beam splitter 42 wherein modulations of polarization are converted to modulations of intensity and are, in turn, reflected to the projection lens 52. It is also important that any spurious light reflected from the red pass filter 48 does not return to projection lens 52. In a preferred arrangement, filter 48 is coated on a 3° wedge 62 (FIG. 2) which is sufficient to deflect any reflected (but not transmitted) light outside the acceptance angle of the projection lens 52. Green S light is reflected by the main beam splitter 42 through a green pass filter 56 similarly coated on a 3° wedge 58, to the green channel light valve 60. If the orientation of beam splitter 42 is such that some green P light will reach beam splitter 42, this light will also be partially reflected to the green channel light valve 60 through filter 56 because the performance of the main beam splitter 42 is not so outstanding for green as it is for red, i.e., normally transmitted P light will be partially reflected. When the green channel light valve 60 is "off," (information is not displayed by cathode ray tube 61), this green P light will be reflected by the light valve 60 to the projection lens 52 providing both an inaccurate green component of the projected image and lowered image contrast. In order to prevent this sequence from occurring, the green P light is removed by designing filter 56 in a manner such that only green S is transmitted to light valve 60.

The prism 24 reflects green S and blue S polarized light along path 26 to blue mirror 70, mirror 70 removing the green S component incident thereon and reflecting the blue S polarized light to a blue beam splitter prism 72. A change in orientation at the blue beam splitter, or prism 72 is such that the blue S light is P polarized relative to the blue beam splitter 72. The P polarized blue light is transmitted to a blue channel light valve 74 via a dichroic coating 73. When the light valve 74 is "on," (information displayed by cathode ray tube 75) the P light is converted to the S polarization state, reflected back to the beam splitter 72 which then reflects the light to a blue channel projection lens 78. The blue beam splitter 72 may be of identical construction to that of the main beam splitter 42, the coatings only being different, wedges or a second light valve aperture or window not being required. When light valve 74 is "off," the P light is transmitted back towards the illumination source via beam splitter 72, mirror 70, and beam splitter 24.

An antireflection coating 21 is applied to the input aperture 22 of prism 24 and the prism diagonal 25 is arranged in such a manner that light incident thereon at a 32° angle (58° from the normal) is reflected downward to blue mirror 70 at a 32° angle from the diagonal. Preferably, the blue mirror 70 is orientated such that light from prism 24 is incident thereon at a 32° angle and is reflected off of blue mirror 70 at a 32° angle. Other angles of incidence may be utilized as long as the appropriate optical coatings are selected. An antireflection layer 80 is coated on the reflection aperture 82 formed on prism 24. Due to the focusing requirements of the projector system, for optimum efficiency, the distance, a, between the prism 24 transmission aperture 30 and the input aperture 33 of main beam splitter 42 is equal to the distance b+c, the distance of the light path from reflection window 82 to the mirror 70 to entrance aperture 86 of beam splitter 72. Antireflection coatings are also applied to the blue output aperture 88, and surfaces 92 and 94 of wedges 48 and 58, respectively.

The blue image, it is noted, comes from the blue channel projection lens 78 which is displaced from the red-green projection lens 52 and thus will initially be displaced from the red-green image. In order to register the images, either one of the lenses 52, 78 may be appropriately translated.

The design of the individual dichroic filters 25, 43, 73 were accomplished using general principles. Computer analysis indicated that the best results occur with the red filter having a lower cut-off of 580 nm; the green filter having an upper cut-off of 600 nm and a lower cut-off of 585 nm; the blue filter 34 having an upper cut-off of 530 nm and a lower cut-off of 415 nm.

Although the main beam splitter 42 (polarization selective) and the blue beam splitter 72 are not color selective, they nevertheless have a design "wavelength" which must be chosen; namely the wavelength at which the thin films are a quarter wave thick. Although the performance of a beam splitter varies widely with the design wavelength, it has been determined that a design wavelength of 507 nanometers (nm) for the main beam splitter 42 and a design wavelength of 385 nm and for the blue beam splitter 72 provides optimum results.

In general, filter 20 is designed to remove UV while transmitting visible light; red beam splitter 24 (coating 25) is constructed to reflect blue and green S polarized light and to transmit red, green and blue P and red S polarized light; blue filter 34 is constructed to reject blue light; main beam splitter 42 (dichroic coating 43) is constructed to transmit red P polarized light and reflect green S polarized light; red filter 48 is constructed to pass red light and reflect green light; green filter 56 has an optical thin film coating which is effective to pass green light and reflect red light; blue mirror 70 is essentially a long pass edge filter to reflect only incident blue light; and blue prism 72 (coating 73) is constructed to function as a Brewster angle polarizing beam splitter.

An example of the construction data utilized in fabricating the optical elements which comprise system 10 will now be set forth. In the notation system utilized, T represents titanium dioxide and S represents silicon dioxide. To illustrate the calculation for a layer thickness for a quarter wave at $\lambda=342$ nanometers (nm), the notation 0.508T represents a layer of titanium dioxide of thickness 18.72 nm ($0.508 \times \frac{1}{4} \times 342 \times 342 \div 2.32$). The index of refraction of silicon dioxide is 1.46; for titanium dioxide 2.32.

1. UV Filter 20

Indice: Glass=1.54
Unit: Quarter wave at $\lambda=342$ nm

Normal Incidence: Glass 0.508T 0.975S 0.955T 1.027S 0.925T 1.05S 0.994T 1.032S 1.016T 1.028S 1.027T 1.064S 1.013T 1.008S 1.067T 1.027S 1.01T 1.006S 1.065T 1.027S 0.964T 0.982S 0.981T 1.98S Air.

Prepolarizing Coating 25

Indices: Glass=1.46, Oil=1.46
Unit: Quarter wave at λ=411 nm
58° Incidence: Glass 0.475T 0.95S 0.95T 0.95S 0.975T 6(S T) S 0.975T 0.95S 0.95T 0.95S 0.475T Oil.

3. Blue Rejection Filter 34

Indices: Fused silica=1.46
Unit: Quarter wave at λ=407 nm
Normal Incidence: Fused silica 0.546T 0.884S 0.958T 1.003S 0.939T 0.985S 0.982T 1.058S 1.039T 0.977S 1T 1.01S 1.025T 1.02S 1.009T 0.966S 1.024T 1.025S 0.99T 0.983S 0.948T 0.926S 0.912T 1.898S Air.

4. Beam splitter Prism Coating 43

Indices: Glass=1.46, Oil=1.46
Unit: Quarter wave at λ=507 nm
58° Incidence: Glass 7(0.5T 1S 0.5T) Oil (seven identical sets of three layers).

5. Red Filter 48

Indices: Glass=1.46, Oil=1.46
Unit: Quarter wave at λ=490 nm
3.5° Incidence: Glass 2(0.466T 0.932S 0.466T) 7(0.5T 1S 0.5T) 2(0.466T 0.932S 0.466T) Oil.

6. Green Filter 56

Indices: Glass=1.46, Oil=1.46
Unit: Quarter wave at λ=689 nm
3.5° Incidence: Glass 0.795T 2(0.532T 1.064S 0.532T) 5(0.5T 1S 0.5T) 2(0.532T 1.064S 0.532T) 0.795T Oil.

7. Blue Mirror 70

Indices: Glass (nominal) 1.5052
Unit: Quarter wave at λ=426 nm
58° Incidence: Glass 1.43T 10(0.5S 1T 0.5S) 1.43S Air.

Blue Prism Coating 73

Indices: Glass=1.46, Oil=1.46
Unit: Quarter wave at λ=385 nm
58° Incidence: Glass 7(0.5T 1S 0.5T) Oil.

FIG. 3 is a perspective view of the optical layout arrangement shown in FIGS. 1 and 2. The perspective view clearly illustrates the physical relationship between the various optical components forming optical system 10.

In summary, an improved optical system for use in a two lens three primary liquid crystal light valve projector has been provided by the present invention. A color selective prepolarizer 24 is used to split the illumination beam 11 into two paths based on both color and polarization. Light from path 28 is further split into red and green primary colors while the light from the other optical path 26 is filtered to become the blue primary color. The optical system described is more efficient than the prior art designs for achieving three primary colors, for high contrast projection. The use of fewer optical components than utilized previously reduces system cost and complexity and also increases the efficiency of light collection at the light valves.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. In a multi color projection system, having first means for providing a source of light energy, first, second and third liquid crystal light valves; first, second and third means for providing an optical signal for use in combination with said first, second and third liquid crystal light valves; and first and second projection lenses, the improvement comprising:

a first beam splitter for splitting light incident thereon into first and second beams, said first beam including first and second color components having said first polarization state and a first color component having a second polarization state; said second beam including said second color component and a third color component, both of said second and third color components having said second polarization state;

a second beam splitter mounted in the optical path of said first beam and oriented with respect to said first beam splitter, to reverse the polarization states of the light incident thereon and to direct the first color component of said first polarization state to said first light valve and polarization modulated light from said first light valve to said first projection lens; said second beam splitter also directing the second color component of said second polarization state to said second light valve and polarization modulated light from said second light valve to said first projection lens; and a third beam splitter responsive to said third color component and oriented with respect to said second beam for reversing the polarization state of said third color component and for directing said third color component having a first polarization state to said third light valve and polarization modulated light from said third light valve to said second projection lens.

2. The projection system of claim 1 wherein an optical filter for passing only said first color component is coupled to said first light valve.

3. The projection system of claim 2 wherein said filter is mounted on a wedged-shaped member whereby incident light, other than said first color component is reflected at an angle different than the angle of incidence.

4. The projection system of claim 1 wherein an optical filter for passing only said second color component is coupled to said second light valve.

5. The projecton system of claim 3 wherein said filter is mounted on a wedged-shaped member whereby incident light, other than said second color component is reflected at an angle different than the angle of incidence.

6. The projection system of claim 1 wherein said means for providing optical input signals comprise cathode ray tubes.

7. The projection system of claim 1 wherein said first, second and third beam splitters are immersed in oil.

8. The projection system of claim 7 wherein an ultra violet filter is interposed between said inoident light and said first beam splitter.

9. The projection system of claim 1 including optical means disposed in the path of said second beam for reflecting said third color component to said third beam splitter.

10. The optical system of claim 9 wherein the distance separating said first and second beam splitters is substantially equal to the distance that the second beam travels between said first beam splitter and said third beam splitter.

11. The projection system of claim 9 wherein said optical means disposed in the path of said second beam for reflecting said third color component is a blue mirror.

12. An optical system comprising:
 a first beam splitter for splitting light incident thereon into first and second beams, said first beam including first and second color components having a first polarization state and a first color components having a second polarization state; said second beam including said second color component and a third color component, both of said second and third color components having said second polarization state;
 a second beam splitter mounted in the optical path of said first beam, and oriented with respect to said first beam splitter to reverse the polarization states of the light incident thereon and to direct the first color component of said first polarization state to a first surface and a modulated light beam from said first surface to a second surface; said second beam splitter also directing the second color component of said second polarization state to a third surface and polarization modulated light from said third surface to said second surface; and
 a third beam splitter responsive to said third color component and oriented with respect to second beam for reversing the polarization state of said third color component and for directing said third color component having a first polarization state to a first surface and modulated light from said first surface to a second surface.

13. The optical system of claim 12 wherein an optical filter for passing only said first color component is coupled to said first surface.

14. The optical system of claim 13 wherein said filter is mounted on a wedged-shaped member whereby incident light other than said first color component is reflected at an angle different than the angle of incidence.

15. The optical system of claim 12 wherein an optical filter for passing only said second color component is coupled to said third surface.

16. The optical system of claim 15 wherein said filter is mounted on a wedged-shaped member whereby incident light other than said second color component is reflected at an angle different than the angle of incidence.

17. The optical system of claim 1 wherein said modulated light is provided by an arrangement comprising light valves and means for providing an optical input signal.

18. The projection system of claim 12 including optical means disposed in the path of said second beam for reflecting said third color component to said third beam splitter.

19. The projection system of claim 18 wherein said optical means disposed in the path of said second beam for reflecting said third color component is a blue mirror.

20. The projection system of claim 18 wherein the distance separating said first and second beam splitters is substantially equal to the distance that the second beam travels between said first beam splitter and said third beam , splitter.

* * * * *

UNITED STATES PATENT AND TRADEMARK OFFICE
CERTIFICATE OF CORRECTION

PATENT NO. : 4,715,684

DATED : Dec. 29, 1987

INVENTOR(S) : Ralph J. Gagnon

It is certified that error appears in the above-identified patent and that said Letters Patent is hereby corrected as shown below:

Column 6, line 62, delete the second occurrence of "x342" from the formula.

Column 8, line 12, between "optical" and "signal", insert --input--.

Signed and Sealed this

Twenty-eighth Day of March, 1989

Attest:

DONALD J. QUIGG

Attesting Officer

Commissioner of Patents and Trademarks